(12) United States Patent  (10) Patent No.: US 9,145,840 B2
Martin et al.  (45) Date of Patent: Sep. 29, 2015

(54) AUTOMOTIVE VEHICLE AND METHOD FOR OPERATING AN ENGINE THEREIN

(71) Applicant: Ford Global Technologies, LLC, Dearborn, MI (US)

(72) Inventors: Douglas Raymond Martin, Canton, MI (US); Edward Badillo, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/291,235

(22) Filed: May 30, 2014

(65) Prior Publication Data

US 2014/0278008 A1 Sep. 18, 2014

Related U.S. Application Data

(63) Continuation of application No. 12/421,023, filed on Apr. 9, 2009, now Pat. No. 8,746,381.

(51) Int. Cl.
| | |
|---|---|
| *B60W 10/06* | (2006.01) |
| *F02D 33/00* | (2006.01) |
| *F02D 29/02* | (2006.01) |
| *F02D 37/02* | (2006.01) |
| *F02D 41/14* | (2006.01) |
| *B60L 11/12* | (2006.01) |
| *F02D 28/00* | (2006.01) |
| *F02D 41/06* | (2006.01) |

(52) U.S. Cl.
CPC ............... *F02D 33/00* (2013.01); *B60L 11/12* (2013.01); *F02D 28/00* (2013.01); *F02D 29/02* (2013.01); *F02D 37/02* (2013.01); *F02D 41/1497* (2013.01); *B60L 2240/429* (2013.01); *F02D 41/064* (2013.01); *Y02T 10/642* (2013.01); *Y02T 10/7005* (2013.01); *Y02T 10/7077* (2013.01)

(58) Field of Classification Search
USPC ....................................... 180/65.28
See application file for complete search history.

(56) References Cited

U.S. PATENT DOCUMENTS

| | | | |
|---|---|---|---|
| 6,233,508 B1 | 5/2001 | Deguchi et al. | |
| 6,425,373 B1 | 7/2002 | Robichaux et al. | |
| 6,467,458 B1 | 10/2002 | Suzuki et al. | |
| 6,522,024 B1 | 2/2003 | Takaoka et al. | |
| 6,845,305 B1 | 1/2005 | Raftari et al. | |
| 7,182,065 B2 | 2/2007 | Andersen et al. | |
| 7,291,935 B2 * | 11/2007 | Yamashita et al. | 290/40 C |
| 7,347,184 B2 * | 3/2008 | Kuroda et al. | 123/434 |
| 7,389,682 B2 | 6/2008 | JaVaherian | |

* cited by examiner

*Primary Examiner* — Jeffrey J Restifo
*Assistant Examiner* — Erez Gurari
(74) *Attorney, Agent, or Firm* — David B. Kelley; Brooks Kushman P.C.

(57) ABSTRACT

A method for operating an engine in a vehicle includes measuring a current to or from a generator mechanically coupled with the engine and determining at least one operating parameter of the engine. The method also includes providing an amount of fuel to the engine based on the current and the at least one operating parameter.

8 Claims, 2 Drawing Sheets

AUTOMOTIVE VEHICLE AND METHOD FOR OPERATING AN ENGINE THEREIN

CROSS-REFERENCE TO RELATED APPLICATION

This application is a continuation of application Ser. No. 12/421,023, filed Apr. 9, 2009, which is hereby incorporated by reference herein.

BACKGROUND

Certain techniques are known for controlling an automotive vehicle engine. As an example, U.S. Pat. No. 7,182,065 discloses a method for selectively adjusting an amount of fuel to an engine in a vehicle. The method includes providing an amount of fuel to the engine based on a desired output of the engine. An electric machine is commanded to control the engine speed based on driver input. An output error of the engine is determined based on the command to the electric machine. The amount of fuel provided to the engine is adjusted when at least one predetermined condition is met, including the output error of the engine being greater than a predetermined amount.

SUMMARY

A method for operating an engine in a vehicle includes measuring a current to or from a generator mechanically coupled with the engine and determining at least one operating parameter of the engine. The current is indicative of an actual torque output by the engine. The at least one operating parameter is indicative of an expected torque output by the engine. The method also includes providing an amount of fuel to the engine based on the current and the at least one operating parameter.

A method for operating an engine in a vehicle includes determining a measured torque output by the engine, determining an expected torque output by the engine, and providing an amount of fuel to the engine based on a ratio of the measured to expected torques.

An automotive vehicle includes an engine and an electric machine mechanically coupled with the engine. The vehicle also includes at least one controller configured to command an amount of fuel to the engine based on a current to or from the electric machine and at least one operating parameter of the engine.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
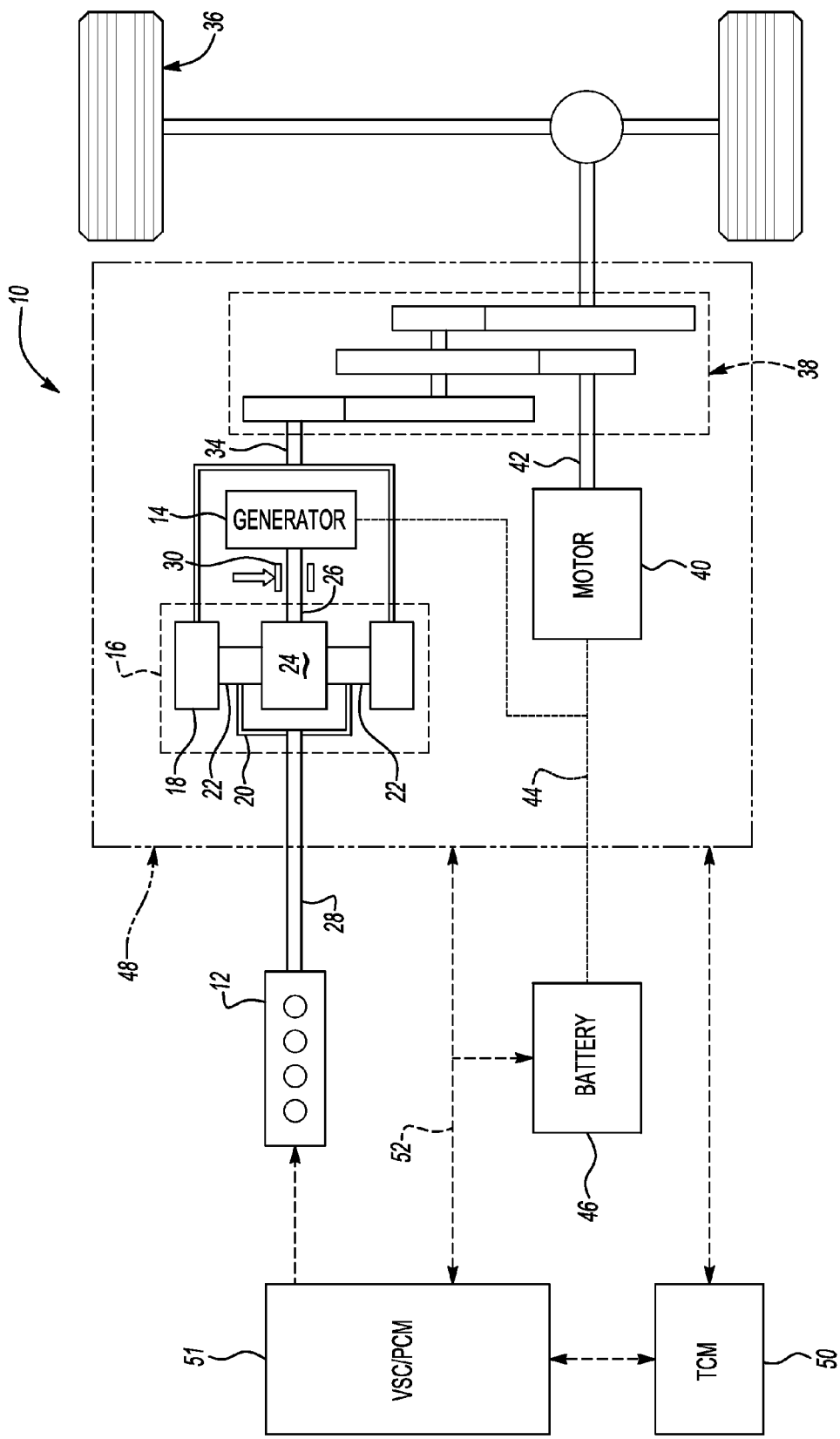
FIG. 1 is a schematic representation of a portion of an embodiment of an automotive vehicle.

Referring now to FIG. 1, an embodiment of an automotive vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24. In other embodiments, however, the vehicle 10 may a powertrain with any one of several suitable configurations. For example, the vehicle 10 may be exclusively powered by an internal combustion engine, etc.

The generator 14 may be used as a motor, outputting torque to a shaft 26 connected to the sun gear 24. Similarly, the engine 12 may output torque to a shaft 28 connected to the carrier 20. A brake 30 is provided for stopping rotation of the shaft 26, thereby locking the sun gear 24 in place.

The ring gear 18 is connected to a shaft 34, which is connected to vehicle drive wheels 36 through a second gear set 38. The vehicle 10 may include a second electric machine, or motor 40, which may be used to output torque to a shaft 42. Other vehicles, however, may have different electric machine arrangements, such as a greater or fewer number of electric machines. In the embodiment of FIG. 1, the motor 40 and the generator 14 may both be used as motors to output torque. Alternatively, each may be used as a generator, outputting electrical power to a high voltage bus 44 and to an energy storage device, or battery 46.

The battery 46 of FIG. 1 is a high voltage battery that is capable of outputting electrical power to operate the motor 40 and the generator 14 when the generator acts as a motor. Other types of energy storage devices and/or energy output devices may also be used with the vehicle 10. For example, a capacitor may be used, which, like a high voltage battery, is capable of both storing and outputting electrical energy. Alternatively, a fuel cell may be used in conjunction with a battery and/or capacitor to provide electrical power for the vehicle 10.

The motor 40, the generator 14, the planetary gear set 16, and a portion of the second gear set 38 may generally be referred to as a transaxle 48. A controller, or transaxle control module (TCM) 50, controls the components of the transaxle 48, e.g., the generator 14 and motor 40. In addition to the TCM 50, the vehicle 10 may also include a second controller, which, in the embodiment of FIG. 1, is a combination vehicle system controller and powertrain control module (VSC/PCM) 51. The VSC/PCM 51 communicates with the TCM 50 and the engine 12, and also communicates with the transaxle 48 and the battery 46 through a controller area network (CAN) 52. Although the VSC/PCM 51 is shown as a single, integrated controller, the VSC and PCM may be contained in separate controllers. In addition, other controllers, such as the TCM 50, could be integrated into the VSC/PCM 51, so that the functions of each of the controllers shown in FIG. 1 were carried out by a single hardware device.

The various devices controlled by the VSC/PCM 51 may include their own controllers. For example, an engine control unit (ECU) may communicate with the VSC/PCM 51 and may perform control functions on the engine 12. This ECU may determine engine airflow, spark advance and desired air/fuel ratio needed to achieve a commanded or desired torque target. As known to those of ordinary skill, the desired air/fuel ratio may be determined by various powertrain system requirements which may include cold starting, cold start emissions, warm engine operation, etc. During cold engine operation, however, the actual air/fuel ratio may vary based on fuel volatility.

The battery 46 may have a battery control module (BCM) that sends and receives signals to and from the VSC/PCM 51 and the battery 46. The transaxle 48 may also include one or more controllers configured to control specific components within the transaxle 48, such as the generator 14 and/or the motor 40. Such controllers may communicate with both the TCM 50 and the VSC/PCM 51 via the CAN 52.

As discussed above, the generator 14 is configured to control the speed of the engine 12, i.e., the engine 12 is operated in a speed control mode. As the engine 12 operates, its speed may be monitored by one or more speed sensors (not shown), such that the generator 14 may provide positive or negative torque through the planetary gear set 16 to maintain the speed of the engine 12 approximately constant. The relationship between the generator 14 and the engine 12 provides a mechanism for adjusting the amount of fuel to the engine 12.

As the vehicle 10 is operated, a number of inputs, including driver inputs, may be received, for example, by the VSC/PCM 51 (or any other suitable controller(s)). As an example, an accelerator pedal position and/or a brake pedal position may be monitored in a known fashion, and signals sent to the VSC/PCM 51 to determine desired vehicle outputs. As another example, energy produced or stored by the generator 14 may be monitored in a known fashion, e.g., via a current sensor, and signals sent to the VSC/PCM 51 to determine a measured brake torque output by the engine 12. A mapping of generator current versus engine brake torque stored in the VSC/PCM 51, for example, may be used in such a determination. Alternatively, a strain associated with a crankshaft of the engine 12 may be monitored in a known fashion, e.g., a strain gauge, and signals sent to the VSC/PCM 51 to determine a measured brake torque output by the engine 12. A mapping of crankshaft strain versus engine brake torque stored in the VSC/PCM 51, for example, may be used in such a determination. (These mappings may be generated via testing under laboratory conditions and/or computer simulation.) Of course, any suitable technique may be used to measure the brake torque output by the engine 12. As yet another example, mass air and mass fuel to the engine 12 may be monitored in a known fashion, e.g., via sensors, and signals sent to the VSC/PCM 51 to determine an expected brake torque output by the engine 12.

As known to those of ordinary skill, the mass air flow to the engine 12 may be measured directly with an airflow sensor (not shown) or calculated from other sensor measurements; other engine operating parameters, such as spark advance and commanded air fuel/ratio are, of course, also available to the VSC/PCM 51 because they may be required for basic control of the engine 12. The VSC/PCM 51 (or any other suitable controller(s)) may thus determine the expected brake and indicated torque output by the engine 12 based on, for example, a mapping of the mass air flow, spark advance and commanded air/fuel ratio versus engine speed. (This mapping may, for example, be generated via testing and/or computer simulations.) Any suitable engine operating parameters, however, may be used.

The VSC/PCM 51 may break down the desired vehicle output into device-specific signals that may be used to command the various devices and/or communicate with other controllers. For example, based on the desired vehicle output torque, the VSC/PCM 51 may calculate a desired engine torque, which may be sent directly to the engine 12, or to an intermediate controller, such as an ECU (not shown). Similarly, the VSC/PCM 51, based at least in part on the driver inputs, may calculate a desired engine speed, and may communicate it to the TCM 50. The TCM 50 may then provide a command to the generator 14 to control the speed of the engine 12.

Figure 2:
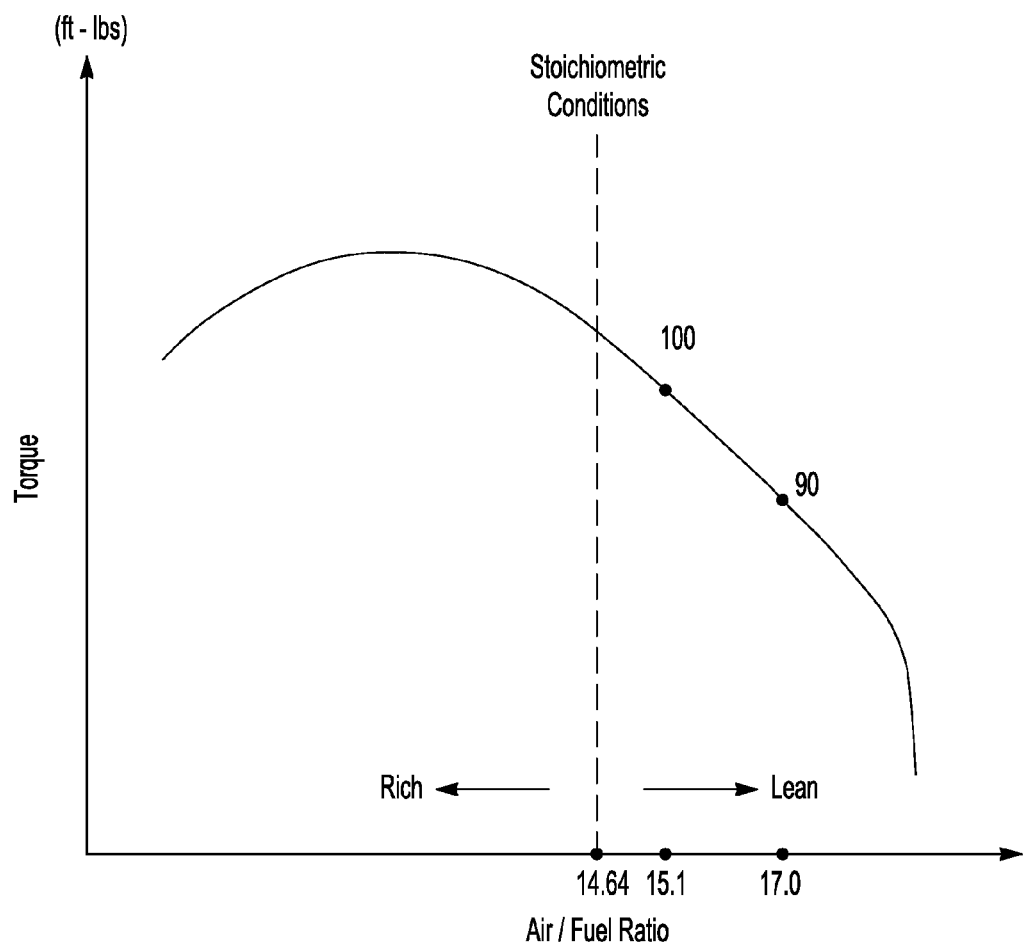
FIG. 2 is an example plot of indicated torque versus air/fuel ratio for an engine of FIG. 1.

Referring now to FIGS. 1 and 2, those of ordinary skill will recognize FIG. 2 as a plot of engine indicated torque (brake torque plus friction and pumping losses) versus air/fuel ratio at a given spark advance and mass air flow to the engine 12. As known in the art, the shape of the curve may change as the spark advance and/or mass air flow change. Such curves may be generated, for example, by mapping the engine 12 under laboratory conditions. Data related to these curves may be stored in the VCS/PCM 51 (or other suitable controller(s)).

As known in the art, the curve illustrated in FIG. 2 includes a generally linear portion (lean) to the right of stoichiometric conditions and a non-linear portion (rich) to the left of stoichiometric conditions. In the generally linear region, indicated torque and air/fuel ratio are proportional to each other.

As discussed above, the VSC/PCM 51 (or other suitable controller(s)) may determine a measured brake torque output by the engine 12. Accounting for friction and pumping losses in the system, the VSC/PCM 51 may also determine a measured indicated torque output by the engine 12. In the example of FIG. 2, the measured indicated torque output by the engine 12 is equal to 90 ft-lbs, which corresponds to an air/fuel ratio within the engine 12 of 17.0. As also discussed above, the commanded air fuel/ratio to the engine 12 is available to the VSC/PCM 51. In the example of FIG. 2, the commanded air/fuel ratio is equal to 15.1, which corresponds to an expected indicated torque output by the engine 12 of 100 ft-lbs. (That is, the indicated torque expected to be output by the engine 12 given the commanded air/fuel ratio.) Under different operating states of the engine 12, such as engine start-up, differences may thus arise between the actual and commanded air/fuel ratio (measured and expected indicated output torques). This, of course, may influence the emissions performance of the vehicle 10.

Minimum cold start emissions may be achieved by operating lean of stoichiometry. Excessive lean operation (e.g., from hesitation fuel due to low volatility), especially during cold engine conditions, however, may result in excessive emissions as well as engine roughness. Therefore, there may be a narrow window of operation lean of stoichiometric conditions that the engine 12 needs to operate within to minimize emissions and roughness.

The VSC/PCM 51 (or other suitable controller(s)) may alter the amount of fuel provided to the engine 12 based on the above analysis. In the example of FIG. 2, the ratio of the measured indicated torque (90 ft-lbs) to the expected indicated torque (100 ft-lbs) is 0.9. This corresponds to an air-fuel ratio that is approximately 12% lean of the target air/fuel ratio of 15.1. The VSC/PCM 51 may, for example, increase the amount of fuel to the engine 12 by approximately 12% (or some other suitable amount, e.g., something less than 12%) thereby reducing the actual air/fuel ratio (increasing measured indicated torque) by approximately 12% in order to approach the commanded air/fuel ratio that is optimum for emissions performance. (Differences in actual air/fuel ratio and commanded air/fuel ratio may thus result in an increase in engine emissions.)

In some embodiments, the VSC/PCM 51 may determine whether the difference between the actual air/fuel ratio (measured indicated torque) and the commanded or expected air/fuel ratio (expected indicated torque) is greater than a threshold, e.g., 8%, before altering the amount of fuel provided to the engine 12. If the threshold is exceeded, the VSC/PCM 51 may then increase (or decrease) the amount of fuel to the engine 12 by some fixed amount or a variable amount that is a function of the difference. Other control scenarios are also possible.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A method for operating an engine in a vehicle comprising:
providing an amount of fuel to the engine based on a ratio of an actual toque output by the engine to an expected torque output by the engine, wherein the actual torque is based on current to or from a generator mechanically coupled with the engine and the expected torque is based on at least one operating parameter of the engine.

2. The method of claim 1 wherein the at least one operating parameter is mass air flow to the engine.

3. The method of claim 1 wherein the at least one operating parameter is spark advance of the engine.

4. The method of claim 1 wherein the at least one operating parameter is a commanded air/fuel ratio within the engine.

5. An automotive vehicle comprising:
an engine;
an electric machine mechanically coupled with the engine; and
at least one controller configured to command an amount of fuel to the engine based on a ratio of an actual toque output by the engine to an expected torque output by the engine, wherein the actual torque is based on a current to or from the electric machine and the expected torque is based on at least one operating parameter of the engine.

6. The system of claim 5 wherein the at least one operating parameter is mass air flow to the engine.

7. The system of claim 5 wherein the at least one operating parameter is spark advance of the engine.

8. The system of claim 5 wherein the at least one operating parameter is a commanded air/fuel ratio within the engine.

* * * * *